Patented June 1, 1926.

1,586,964

UNITED STATES PATENT OFFICE.

CHARLES H. CAMPBELL, OF LYNN, MASSACHUSETTS.

TANNED LEATHER, FILLER THEREFOR, AND PROCESS RELATING THERETO.

No Drawing.   Application filed August 11, 1924. Serial No. 731,492.

The object of the invention is to so treat or fill the stock with such material or substance as will increase the wearing quality of the leather after tanning. A further object is to employ as a filler such substance as will possess no deleterious properties; a filler that will be homogeneous with the hide substance itself and one also that will be capable of penetrating the stock, in other words, one having little or no viscosity.

I have found that the objects of my invention are attained if the stock be filled with certain protein derivatives obtained by hydrolytic decomposition or cleavage from the simple proteins of the albuminoid group which comprise collagen, gelatine, keratin and elastin, substances which make up in a large measure the organic part of the skeletal structure of animals, and the filler afterwards rendered insoluble.

The protein derivatives or filler employed in accordance with my invention are those soluble protein derivatives or cleavage products obtained by the hydrolytic decomposition of the simple proteins above referred to, and especially those derivatives obtained by the hydrolytic decomposition of the simple proteins to the point of obtaining proteoses, or peptones, but short of such hydrolytic decomposition as will form the amino-acids, though some may be present.

The process is as follows: The albuminous matter of the simple proteins, obtained from any source where such constitute a waste material, is first placed in a closed digester. Hydrolytic decomposition is effected by admitting steam to the interior of the digester at about 100 lbs. pressure for approximately two hours. If less pressure of steam be used a longer time is required, for example, 80 lbs. of steam would require about four hours to obtain proper effects. At the expiration of that time the pressure is relieved, the material drawn off, passed through any suitable filter and evaporated to a consistency of preferably about 50% solids and 50% water. It will then be found that the hydrolytic decomposition of the simple proteins has been carried on to a point where the resulting protein derivatives comprise proteoses with some peptones, both soluble in character, but the decomposition has not been carried on so far as to reduce the proteins to the amino-acids, at least to any appreciable extent.

The protein derivatives thus obtained constitute the filler and are characterized by a solution possessing little or no viscosity. The filler is applied to the stock in the following manner. The stock is placed in a tumbling wheel, well known to those skilled in the art, and the proper proportion of digested liquor or filler is then placed in the wheel with the stock. If the stock be hide stock, after the dehairing of the hides they are rinsed and preferably passed through a wringer to remove any surplus moisture. In practice there is placed in the wheel with the stock from two to five pounds of filler for each hide or side of leather, depending upon the size and condition of the stock, poor stock requiring the more filler. As the wheel is revolved a tumbling process ensues within the wheel that pounds the digested albuminous liquor or filler into the stock, the operation of the wheel being continued for a somewhat protracted time. In common practice I have found one hour to be satisfactory, although the time will vary depending upon the kind and quality of the stock. After the stock has been filled the filler therein is then rendered insoluble by any of the ordinary processes of tanning. When thus rendered insoluble the filler within the stock becomes deposited therein as an insoluble protein and is substantially of the same character as the substance of the hide or leather itself.

By the "ordinary processes of tanning" as referred to herein, is meant the well known vegetable and mineral processes of tanning.

By "stock" as used herein is meant hide stock or leather to which a subsequent tanning process is applied.

Having thus fully described my invention, I claim and desire to secure by Letters Patent of the United States:—

1. Tanned leather having a filler comprising cleavage products from the hydrolytic decomposition of the simple proteins of the albuminoid group and which filler has been rendered insoluble.

2. Tanned leather having a filler comprising protein derivatives of the albuminoid group obtained by hydrolytic decomposition of simple proteins of said group to a point short of the amino-acids and which filler has been rendered insoluble.

3. Tanned leather having a filler comprising protein derivatives of the albuminoid group obtained by hydrolytic decomposition of simple proteins of said group and which filler has been rendered insoluble by the tanning of the leather.

4. Tanned leather having a filler comprising protein derivatives of the albuminoid group obtained by the hydrolytic decomposition of simple proteins of said group by steam under pressure to the point of obtaining proteoses and peptones and which filler has been rendered insoluble by ordinary process of tanning.

5. The process of improving the substance of tanned leathers which consists in filling the stock with a filler comprising soluble protein derivatives obtained by hydrolytic decomposition of simple proteins of the albuminoid group and afterwards rendering the filler insoluble.

6. The process of improving the substance of tanned leathers which consists in filling the stock with a filler comprising soluble protein derivatives obtained by hydrolytic decomposition of simple proteins of the albuminoid group and afterwards rendering the filler insoluble by any ordinary process of tanning.

7. The process of improving the substance of tanned leathers which consists in filling the stock by mechanical means with a filler comprising protein derivatives in solution obtained by the hydrolytic decomposition of waste albuminous matter to a point where the simple proteins therein are reduced into protein derivatives and afterwards rendering the filler insoluble.

8. The process of improving the substance of tanned leathers which consists in filling the stock by mechanical means with a filler comprising protein derivatives in solution obtained by the hydrolytic decomposition of waste albuminous matter to a point where the simple proteins therein are reduced into protein derivatives and afterwards rendering the filler insoluble by any ordinary tanning process.

9. A filler for leather comprising cleavage products from the hydrolytic decomposition of simple proteins of the albuminoid group.

10. A filler for leather comprising protein derivatives of the albuminoids obtained by the hydrolytic decomposition of the simple proteins of the albuminoid group to a point short of the amino-acids.

11. A filler for leather comprising protein derivatives of the albuminoids obtained by the hydrolytic decomposition of simple proteins of the albuminoid group by steam under pressure to the point of obtaining proteoses and peptones.

CHARLES H. CAMPBELL.